(12) United States Patent
Sandkuehler et al.

(10) Patent No.: US 9,890,273 B2
(45) Date of Patent: Feb. 13, 2018

(54) ETHYLENE POLYMER BLENDS AND ORIENTED ARTICLES WITH IMPROVED SHRINK RESISTANCE

(75) Inventors: Peter Sandkuehler, Tarrangona (ES); Jill M. Martin, Pearland, TX (US)

(73) Assignee: Dow Global Technologies LLC, Midland, MI (US)

(*) Notice: Subject to any disclaimer, the term of this patent is extended or adjusted under 35 U.S.C. 154(b) by 1323 days.

(21) Appl. No.: 13/807,088

(22) PCT Filed: Jun. 24, 2011

(86) PCT No.: PCT/US2011/041718
§ 371 (c)(1),
(2), (4) Date: May 7, 2013

(87) PCT Pub. No.: WO2012/005974
PCT Pub. Date: Jan. 12, 2012

(65) Prior Publication Data
US 2013/0216736 A1      Aug. 22, 2013

Related U.S. Application Data

(63) Continuation of application No. PCT/ES2010/070466, filed on Jul. 6, 2010.

(51) Int. Cl.
*C08L 23/08* (2006.01)
*D01F 6/46* (2006.01)
*E01C 13/08* (2006.01)
*C08L 23/06* (2006.01)

(52) U.S. Cl.
CPC ........... *C08L 23/0815* (2013.01); *C08L 23/08* (2013.01); *D01F 6/46* (2013.01); *E01C 13/08* (2013.01); *C08L 23/06* (2013.01); *C08L 2203/16* (2013.01); *C08L 2205/025* (2013.01); *C08L 2205/03* (2013.01); *Y10T 442/30* (2015.04)

(58) Field of Classification Search
None
See application file for complete search history.

(56) References Cited

U.S. PATENT DOCUMENTS

| | | | |
|---|---|---|---|
| 3,746,607 A * | 7/1973 | Harmon | ............ A61F 13/00008 26/72 |
| 4,597,920 A † | 7/1986 | Golike | |
| 5,382,631 A | 1/1995 | Stehling et al. | |
| 5,684,097 A | 11/1997 | Palmroos et al. | |
| 5,844,045 A | 12/1998 | Kolthammer et al. | |
| 5,986,028 A | 11/1999 | Lai et al. | |
| 6,005,053 A * | 12/1999 | Parikh | ................. C08L 23/0815 525/221 |
| 6,015,617 A | 1/2000 | Maugans et al. | |
| 6,111,023 A | 8/2000 | Chum et al. | |
| 6,306,969 B1 | 10/2001 | Patel et al. | |
| 6,448,341 B1 * | 9/2002 | Kolthammer | ......... C08F 210/16 264/310 |
| 6,509,106 B1 * | 1/2003 | Edwards | ................. C08L 23/06 156/244.11 |
| 6,723,398 B1 * | 4/2004 | Chum | ................. C08L 23/0815 428/35.2 |
| 6,733,851 B2 † | 5/2004 | Ferri | |
| 6,815,059 B2 | 11/2004 | Slootweg et al. | |
| 7,166,676 B2 | 1/2007 | Jacobsen et al. | |
| 7,807,770 B2 | 10/2010 | Lambert et al. | |
| 7,846,552 B2 | 12/2010 | Weeks | |
| 2005/0054791 A1 † | 3/2005 | Nowlin | |
| 2006/0093783 A1 * | 5/2006 | De Clerck | ............. E01C 13/08 428/92 |
| 2006/0188678 A1 | 8/2006 | Ohlsson et al. | |
| 2008/0090955 A1 | 4/2008 | Lambert et al. | |
| 2010/0130692 A1 * | 5/2010 | Cham | ........................ C08J 5/18 525/240 |

FOREIGN PATENT DOCUMENTS

| | | |
|---|---|---|
| EP | 1972703 A1 | 9/2008 |
| EP | 1972704 A1 | 9/2008 |
| WO | 2008/098905 A2 | 8/2008 |
| WO | WO2008141026 | * 11/2008 |

OTHER PUBLICATIONS

PCT/ES2010/070466, International Search Report.
PCT/ES2010/070466, International Preliminary Report on Patentability.
PCT/ES2010/070466, Written Opinion of the International Searching Authority.
PCT/US2011/041718, International Search Report.
PCT/US2011/041718, Written Opinion of the International Searching Authority.

\* cited by examiner
† cited by third party

*Primary Examiner* — Shawnda McKinnon

(57) ABSTRACT

The invention provides an oriented article, for example, a yarn, tape or filaments made from a three component polymer blend.

10 Claims, No Drawings

ETHYLENE POLYMER BLENDS AND ORIENTED ARTICLES WITH IMPROVED SHRINK RESISTANCE

REFERENCE TO RELATED APPLICATIONS

This application claims the benefit of International Application No. PCT/ES10/070,466, filed Jul. 6, 2010, and fully incorporated herein by reference.

FIELD OF THE INVENTION

This invention relates to multimodal ethylene polymer compositions for the manufacture of oriented articles, such as fibers, monofilaments, tapes, and films, as well as oriented articles made from such compositions.

BACKGROUND OF THE INVENTION

Historically, ethylene polymers used for oriented films, fibers, monofilaments, and tapes typically were unimodal polyethylenes having a high density, e.g., above 0.945 gm/cm3.

More recently, bimodal or multimodal blends of specific ethylene polymers have been proposed for film and fiber applications, with a variety of different component compositions and physical properties. For example, EP 696300 and U.S. Pat. No. 6,316,549 (Chum et al.) teach the manufacture of films and fibers from blends of one or more homogeneously branched ethylene polymers with one or more heterogeneously branched ethylene polymers. Those blends can be prepared in situ (e.g., in a multiple-reactor polymerization process) or by blending separately polymerized ethylene polymers. Similarly, U.S. Pat. No. 5,844,045 (Kolthammer et al.) teaches such blends can be made in situ in a multi-stage polymerization process.

U.S. Pat. No. 6,015,617 (Maugans et al.) teaches the use of various multimodal blends of specific ethylene polymers (such as metallocene-catalyzed homogeneous ethylene copolymers having a density<0.90 gm/cm$^3$, with a Ziegler-Natta-catalyzed heterogeneous ethylene polymer having a density of 0.935 to 0.955 gm/cm$^3$) can improve the bonding performance of the films or fibers or rotomolded articles made from such blends.

EP 898586 (Jacobson et al.) teaches the manufacture of films and other fabricated articles from a broad range of blends made from (a) certain metallocene-catalyzed ethylene copolymers having a narrow molecular-weight distribution and a unique comonomer-content distribution, and (b) one or more other ethylene-based polymers, such as Ziegler-Natta catalyzed polymers and/or metallocene-catalyzed linear or substantially linear ethylene polymers.

EP 1378592 (Slootweg et al.) and WO 2008/098905 (Buriani et al.) teach certain bimodal polymeric blends for use in the production of synthetic fibers for artificial turf, in which the blends comprise a first polyethylene or polypropylene component and a second, metallocene-catalyzed plastomer component (such as a metallocene or single-site catalyzed polyolefin).

WO2006/053709 (Lambert et al.) teaches drawn tapes and fibers made from blends of one component having a density of 0.91 to 0.95 gm/cm$^3$, and a second component having a density>0.955 gm/cm$^3$. EP 1833907 (Lambert et al.) teaches the manufacture of tapes, films and artificial turf from bicomponent blends of Ziegler-Natta-catalyzed components—one having a density of 0.92 to 0.94 gm/cm$^3$, and the other having a density of 0.937 to 0.972 gm/cm$^3$.

EP 1972703 (Van Pardon et al.) teaches the manufacture of films, tapes and monofilaments with blends (having an overall density of 0.915 to 0.938) made from a Ziegler-Natta-catalyzed components, one called znLLDPE and the other called znPE. Similarly, EP1972704 (Van Pardon et al.) teaches the manufacture of films, tapes and monofilaments with blends made from metallocene-catalyzed components, one called mLLDPE and the other called mPE, one of which may have a density from 0.900 to 0.930 gm/cm$^3$, and the other having a density from 0.930 to 0.980 gm/cm$^3$. These patents also discuss an optional "prepolymer" component, for the description of which both patents refer to WO9618662.

WO90/03414 (Stehling et al.) teaches various bimodal and trimodal blends of linear ethylene polymers having very narrow molecular weight and composition distributions. The blend components may have a variety of densities, such as in the ranges of 0.85 to 0.90 gm/cm$^3$, from 0.900 to 0.915 gm/cm$^3$, from 0.915 to 0.940 gm/cm$^3$, and above 0.940 gm/cm$^3$.

Additional polymer compositions, films and/or coatings are described in the following references: U.S. Pat. No. 5,986,028, and International Publication Nos. WO 2006/091310, WO 2004/026955 and WO 1998/21276.

Unfortunately, the performance of the incumbent ethylene polymers has been unsatisfactory in certain oriented article applications, such as artificial turf. Linear low density polyethylene (LLDPE) at densities below about 0.925 gm/cm$^3$, when extruded into oriented tapes or fibers, typically exhibit high shrinkage values, such as 10 percent or greater. That shrinkage often results in performance problems for the end-use of such tapes, such as the monofilament fibers for artificial turf applications, where thermally induced elastic-memory results in curling and/or twisting of the fibers. This shrinkage problem is exacerbated when a metallocene-catalyzed, elastomeric ethylene polymer is blended with the LLDPE for the purpose of improving the elastic recovery (or resiliency) of the fibers.

Accordingly, there is a continuing need to develop polymers which can be formed into oriented articles having a highly desired combination and balance of properties (e.g., lower shrinkage and therefore, higher dimensional stability and lower elastic-memory effects, while also maintaining or improving tenacity and residual elongation) compared to incumbent ethylene-based polymers.

We have invented certain multimodal ethylene polymer compositions that unexpectedly improve the shrinkage performance, as well as improving the tenacity and residual elongation performance of oriented articles made from those compositions.

SUMMARY OF THE INVENTION

This invention provides an oriented article fabricated from a polymeric blend comprising:
(a) 20 to 50 parts of a first component (A) comprising a homogeneous ethylene polymer, preferably linear or substantially linear, having a density between 0.85 and 0.905 gm/cm$^3$, and a Mw/Mn less than 3, and a melt index ($I_2$) between 0.5 and 5 gm/10 minutes; and
(b) 30 to 80 parts of a second component (B) comprising a heterogeneous branched ethylene polymer having a density between 0.91 and 0.945 gm/cm$^3$, and a Mw/Mn greater than 3.5, and a melt index ($I_2$) between 0.5 and 10 gm/10 minutes; and (c) 2 to 25 parts of a third component (C) comprising an ethylene polymer having a density greater than 0.945 gm/cm$^3$, and a melt index (I$_2$) between 0.01 and 10 gm/10 minutes.

Preferably, the article has:
(i) a thermal shrinkage (as measured by taking the % length reduction of 1 meter of filament after inserting it in 90° C. hot silicon oil for 20 seconds), which is no greater than 75% of a comparably dimensioned and oriented article fabricated from a polymer composition comprising only the first and second components, and
(ii) a softness (as measured by tensile test and calculating the stiffness of the oriented tape: Tenacity and residual elongation are measured on a Zwick tensile tester on a filament length of 260 mm and an extension rate of velocity=250 mm/min until filament break. Tenacity is defined as the tensile stress at break divided by the linear weight (dtex). Residual elongation is the strain at fiber break. The initial (0/0) and first datapoint (F/L) of the tensile curve are used to calculate the stiffness by dividing the tenacity (cN/tex) of the tape at an extension of 20 mm by this same extension, obtaining a tape stiffness k, expressed in units of cN/tex/mm), which is no less than 15% of the softness of that comparably dimensioned and oriented article (as discussed above), and
a density of less than 0.925 g/cc.

Also preferably, the polymeric blend of the article has a relationship between stiffness, in cN/tex/mm, and density, in g/cm$^3$, such that stiffness≤4.8364(density)−4.3324, preferably such that stiffness≤1.2151(density)−1.0225.

The article can be in the form of a woven or cross-laid composite sheet, monofilaments, artificial turf yarn, a bi-axially oriented film, or a stretch film.

In another embodiment, the invention is a process for forming an oriented article described above in which:
(a) the first and second components are blended in situ during the formation of such components in one or more polymerization reactors, to thereby form a blend component (AB), and
(b) the third component (C) is formed in separate polymerization reactor(s), and
(c) the third component is blended ex situ with the partial blend (AB) to form the polymeric blend of claim 1, and
(d) the polymeric blend is then processed to form the oriented article.

Preferably, (a) the first and third components are blended in situ during the formation of such components in one or more polymerization reactors, to thereby form a blend component (AC), and
(b) the second component (B) is formed in separate polymerization reactor(s), and
(c) the second component (B) is blended ex situ with the partial blend (AC) to form the polymeric blend of claim 1, and
(d) the polymeric blend is then processed to form the oriented article.

Also preferably, (a) the second and third components are blended in situ during the formation of such components in one or more polymerization reactors, to thereby form a blend component (BC), and
(b) the first component (A) is formed in separate polymerization reactor(s), and
(c) the first component (A) is blended ex situ with the partial blend (BC) to form the polymeric blend of claim 1, and
(d) the polymeric blend is then processed to form the oriented article.

The third component can be a homogeneous linear or substantially linear ethylene polymer having an Mw/Mn less than 3, or the third component can be a heterogeneous polymer having an Mw/Mn greater than 3.5.

In yet another embodiment, the invention is an oriented article is fabricated from a polymeric blend, wherein the blend comprises at least two DSC melting peaks A and B, wherein one peak A occurs at 120° C. or higher, and wherein peak A is at least 15° C. higher than peak B.

Preferably the blend comprises:
(a) 20 to 50 parts of a first component (A) comprising a homogeneous ethylene polymer having a density between 0.85 and 0.905 gm/cm$^3$, and a Mw/Mn less than 3, and a melt index (I$_2$) between 0.5 and 5 gm/10 minutes; and
(b) 30 to 80 parts of a second component (B) comprising a heterogeneous branched ethylene polymer having a density between 0.91 and 0.945 gm/cm$^3$, and a Mw/Mn greater than 3.5, and a melt index (I$_2$) between 0.5 and 10 gm/10 minutes; and
(c) 2 to 25 parts of a third component (C) comprising an ethylene polymer having a density greater than 0.945 gm/cm$^3$, and a melt index (I$_2$) between 0.01 and 10 gm/10 minutes.

BRIEF DESCRIPTION OF THE DRAWINGS

None

DESCRIPTION OF EMBODIMENTS OF THE INVENTION

Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference) especially with respect to the disclosure of polymerization and/or article-fabrication techniques, definitions (to the extent not inconsistent with any definitions provided herein) and general knowledge in the art.

As discussed above, the invention provides an oriented article that is fabricated from a polymeric blend comprising:
(a) 20 to 50 parts of a first component (A) comprising a homogeneous ethylene polymer having a density between 0.85 and 0.90 gm/cm$^3$, and a Mw/Mn less than 3, and a melt index (I$_2$) between 0.5 and 5 gm/10 minutes; and
(b) 30 to 80 parts of a second component (B) comprising a heterogeneous branched ethylene polymer having a density between 0.91 and 0.945 gm/cm$^3$, and a Mw/Mn greater than 3.5, and a melt index (I$_2$) between 0.5 and 10 gm/10 minutes; and
(c) 2 to 25 parts of a third component (C) comprising an ethylene polymer having a density greater than 0.945 gm/cm$^3$, and a melt index (I$_2$) between 0.01 and 10 gm/10 minutes.

In one embodiment, the polymeric blend has a relationship between stiffness, in cN/tex/mm, and density, in g/cm$^3$, such that stiffness≤4.8364(density)−4.3324, preferably such that stiffness≤1.2151(density)−1.0225.

In one embodiment, the article is in the form of a woven or cross-laid composite sheet.

In one embodiment, the article is in the form of monofilaments.

In one embodiment, the article is in the form of artificial turf.

In one embodiment, the article is in the form of a bi-axially oriented film.

In one embodiment, the article is in the form of a stretch film.

In one embodiment, the homogeneous ethylene polymer of the first component is a substantially linear ethylene copolymer.

In one embodiment, the homogeneous ethylene polymer of the first component is a linear ethylene copolymer.

In one embodiment, the ethylene polymer of the third component is a homogeneous linear or substantially linear ethylene polymer having an Mw/Mn less than 3.

In one embodiment, the ethylene polymer of the third component is a heterogeneous polymer having an Mw/Mn greater than 3.5.

The invention also provides a process for forming an inventive oriented article, in which:
 (a) the first and second components are blended in situ during the formation of such components in one or more polymerization reactors, to thereby form a blend component (AB), and
 (b) the third component (C) is formed in separate polymerization reactor(s), and
 (c) the third component is blended ex situ with the partial blend (AB) to form the polymeric blend as discussed above, and
 (d) the polymeric blend is then processed to form the oriented article.

The invention also provides a process for forming an inventive oriented article, in which:
 (a) the first and third components are blended in situ during the formation of such components in one or more polymerization reactors, to thereby form a blend component (AC), and
 (b) the second component (B) is formed in separate polymerization reactor(s), and
 (c) the second component (B) is blended ex situ with the partial blend (AC) to form the polymeric blend as discussed above, and
 (d) the polymeric blend is then processed to form the oriented article.

The invention also provides a process for forming an inventive oriented article, in which:
 (a) the second and third components are blended in situ during the formation of such components in one or more polymerization reactors, to thereby form a blend component (BC), and
 (b) the first component (A) is formed in separate polymerization reactor(s), and
 (c) the first component (A) is blended ex situ with the partial blend (BC) to form the polymeric blend as discussed above, and
 (d) the polymeric blend is then processed to form the oriented article.

The invention also provides an oriented article that is fabricated from a polymeric blend, wherein the blend comprises at least two DSC melting peaks A and B, wherein one peak A occurs at 120° C., or higher, and wherein peak A is at least 15° C. higher than peak B. In a further embodiment, the blend comprises:
 (a) 20 to 50 parts of a first component (A) comprising a homogeneous ethylene polymer having a density between 0.85 and 0.90 gm/cm$^3$, and a Mw/Mn less than 3, and a melt index ($I_2$) between 0.5 and 5 gm/10 minutes; and
 (b) 30 to 80 parts of a second component (B) comprising a heterogeneous branched ethylene polymer having a density between 0.91 and 0.945 gm/cm$^3$, and a Mw/Mn greater than 3.5, and a melt index ($I_2$) between 0.5 and 10 gm/10 minutes; and
 (c) 2 to 25 parts of a third component (C) comprising an ethylene polymer having a density greater than 0.945 gm/cm$^3$, and a melt index ($I_2$) between 0.01 and 10 gm/10 minutes.

An inventive article may comprise any one of the embodiments disclosed herein.

An inventive article may comprise two or more embodiments disclosed herein.

An inventive process may comprise any one of the embodiments disclosed herein.

An inventive process may comprise two or more embodiments disclosed herein.

An inventive polymeric blend may comprise any one of the embodiments disclosed herein.

An inventive polymer blend may comprise two or more embodiments disclosed herein.

Definitions

The term "comprising" and derivatives thereof is not intended to exclude the presence of any additional component, step or procedure, whether or not the same is disclosed herein. All compositions claimed herein through use of the term "comprising" may include any additional additive, adjuvant, or compound whether polymeric or otherwise, unless stated to the contrary. In contrast, the term "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The terms "blend," "polymeric blend," or "polymer blend" generally mean a mixture of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art.

The term "comparable" means similar or like.

The term "composition" includes a mixture of materials (such as a blend) which comprise the composition as well as reaction products and decomposition products formed from interaction and reaction between the materials of the composition.

The term "polymer" refers to a compound prepared by polymerizing monomers, whether of the same or a different type of monomer. The generic term "polymer" embraces the terms "homopolymer," "copolymer," "terpolymer" as well as "interpolymer."

The terms "ethylene-based polymer," "ethylene polymer," and like terms, refer to a polymer that contains more than 50 mole percent polymerized ethylene monomer (based on the total amount of polymerizable monomers), and, optionally, may contain at least one comonomer. A homopolymer of ethylene is an ethylene-based polymer.

The term "ethylene/α-olefin interpolymer" refers to an interpolymer that contains at least 50 mole percent polymerized ethylene monomer (based on the total amount of polymerizable monomers), and at least one α-olefin having 3 or more carbon atoms.

The term "homopolymer" is a polymer that contains only a single type of monomer.

The term "interpolymer" refers to polymers prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "oriented article" refers to, for example, an extruded film, slit film, tape, yarn, fiber, or filament, each of which, after cooling from the melt into a solid state, is transported via a first roller (roll), operating at a velocity v0, to, optionally, one or more subsequent rollers (rolls), stretching units (e.g. hot air oven(s)) and/or further rollers (rolls) after stretching unit(s), to a final roller (roll) that runs at a velocity v1, which is at least two times faster than v0, fulfilling following equation: v1/v0>2. Rollers between v0 and v1 can have higher or lower velocities than v1, as long the relation v1/v0>2 is met.

Inventive Blends

The polymeric compositions of this invention (or "inventive blends") comprise blends of at least one ethylene polymer from each of the categories of polymers described below as Components A, B, and C. The inventive blends may be made from components that have been manufactured separately and then blended, or the inventive blends can be made from components, some of which have been blended in situ during the polymerization of one or more of the component polymers. For example, but not by way of limitation, an inventive blend can be made by blending an in-situ-manufactured blend of Components A and B (such as disclosed in U.S. Pat. No. 5,844,045 (Kolthammer et al.) or U.S. Pat. No. 6,316,549 (Chum et al.)) with a separately manufactured Component C. Suitable in situ blends of ethylene polymers useful as Components A and B of the inventive blends include the ethylene polymers marketed by The Dow Chemical Company under the tradename "ELITE."

The inventive blends comprise from 20 to 50 parts of Component A, from 30 to 80 parts of Component B, and from 2 to 25 parts of Component C. In some embodiments, the inventive blends comprise from 25 to 45 parts of Component A, from 35 to 70 parts of Component B, and from 5 to 20 parts of Component C. In other embodiments, the inventive blends comprise from 30 to 50 parts of Component A, from 30 to 50 parts of Component B, and from 5 to 20 parts of Component C. In still other embodiments, the inventive blends comprise from 35 to 45 parts of Component A, from 35 to 45 parts of Component B, and from 5 to 20 parts of Component C. In other preferred embodiments, the inventive blends comprise from 25 to 35 parts of Component A, from 50 to 70 parts of Component B, and from 10 to 20 parts of Component C.

The overall density of the inventive blends should be between 0.89 and 0.925 gm/cm$^3$, preferably between 0.90 and 0.925 gm/cm$^3$, more preferably between 0.905 and 0.925 gm/cm$^3$, and especially between 0.91 and 0.925 gm/cm$^3$.

The overall melt index ($I_2$) of the inventive blends should be between 0.5 and 10 gm/10 minutes; preferably between 1 and 8 gm/10 minutes, more preferably between 1.5 and 6 gm/10 minutes, and especially between 2 and 5 gm/10 minutes.

Component A

Component A comprises one or more homogeneous ethylene polymers having densities between 0.85 and 0.91 gm/cm3, molecular weight distributions (Mw/Mn) less than 3, and melt index ($I_2$) between 0.5 and 5 gm/10 min. The density of Component A is preferably between 0.86 and 0.91 gm/cm$^3$, more preferably between 0.87 and 0.91 gm/cm$^3$, and especially between 0.89 and 0.91 gm/cm$^3$. The melt index ($I_2$) of Component A is preferably between 0.5 and 4 gm/10 minutes, more preferably between 0.5 and 3 gm/10 minutes, and especially between 1 and 3 gm/10 minutes.

Component A may be one or more homogeneously branched linear ethylene/α-olefin interpolymers, such as the linear low density polyethylene polymers made using uniform (i.e., homogeneous) branching distribution polymerization processes and catalysts (such as described in U.S. Pat. No. 3,645,992 (Elston)) in which the comonomer is randomly distributed within a given interpolymer molecule and wherein substantially all of the interpolymer molecules have the same ethylene/comonomer ratio within that interpolymer, but that interpolymer has essentially no long chain branches. These interpolymers comprise ethylene with at least one C3-C20 α-olefin and/or C4-C18 diolefin. Preferred comonomers include propene, 1-butene, 1-pentene, 1-hexene, 4-methyl-1-pentene, 1-heptene, 1-octene, 1-nonene, and 1-decene, more preferably propene, 1-butene, 1-hexene, and 1-octene. Copolymers of ethylene and 1-octene are especially preferred.

Alternatively or in addition, Component A may be one or more homogeneously branched substantially linear ethylene/α-olefin interpolymers having long chain branches, such as those described in U.S. Pat. No. 5,272,236 (Lai et al.) and/or U.S. Pat. No. 5,278,272 (Lai et al.).

Suitable ethylene polymers for Component A include the substantially linear ethylene/α-olefin interpolymers marketed by The Dow Chemical Company under the tradename "ENGAGE." These interpolymers comprise ethylene with at least one C3-C20 α-olefin and/or C4-C18 diolefin. Preferred comonomers include propene, 1-butene, 1-pentene, 1-hexene, 4-methyl-1-pentene, 1-heptene, 1-octene, 1-nonene, and 1-decene, more preferably propene, 1-butene, 1-hexene, and 1-octene. Copolymers of ethylene and 1-octene are especially preferred.

The homogeneously branched substantially linear ethylene/α-olefin interpolymers are described in U.S. Pat. Nos. 5,272,236; 5,278,272; 6,054,544; 6,335,410 and 6,723,810; each incorporated herein by reference. The substantially linear ethylene/α-olefin interpolymers have long chain branching. The long chain branches have the same comonomer distribution as the polymer backbone, and can have about the same length as the length of the polymer backbone. "Substantially linear," typically, is in reference to a polymer that is substituted, on average, with "0.01 long chain branches per 1000 carbons" to "3 long chain branches per 1000 carbons." The length of a long chain branch is longer than the carbon length of a short chain branch, formed from the incorporation of one comonomer into the polymer backbone.

The homogeneously branched substantially linear ethylene/α-olefin interpolymers form a unique class of homogeneously branched ethylene polymers. They differ substantially from the homogeneously branched linear ethylene/α-olefin interpolymers, as discussed above, and, moreover, they are not in the same class as heterogeneous "Ziegler-Natta catalyst polymerized" linear ethylene polymers (for example, ultra low density polyethylene (ULDPE), linear low density polyethylene (LLDPE) or high density polyethylene (HDPE), made, for example, using the technique disclosed by Anderson et al., in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

The homogeneously branched, substantially linear ethylene/α-olefin interpolymers have excellent processability, even though they have a relatively narrow molecular weight distribution. Surprisingly, the melt flow ratio (I10/I2), according to ASTM D 1238, of the substantially linear ethylene interpolymers can be varied widely, and essentially independently of the molecular weight distribution (Mw/Mn or MWD). This surprising behavior is contrary to homogeneously branched linear ethylene interpolymers, such as those described, for example, by Elston in U.S. Pat. No. 3,645,992, and heterogeneously branched, "Ziegler-Natta polymerized," linear polyethylene interpolymers, such as those described, for example, by Anderson et al., in U.S. Pat. No. 4,076,698. Unlike substantially linear ethylene interpolymers, linear ethylene interpolymers (whether homogeneously or heterogeneously branched) have rheological properties, such that, as the molecular weight distribution increases, the I10/I2 value also increases.

Long chain branching can be determined by using 13C Nuclear Magnetic Resonance (NMR) spectroscopy, and can be quantified using the method of Randall (Rev. Macromol. Chem. Phys., C29 (2 &3), 1989, p. 285-297), the disclosure of which is incorporated herein by reference. Two other methods are Gel Permeation Chromatography, couple with a Low Angle Laser Light Scattering detector (GPCLALLS), and Gel Permeation Chromatography, coupled with a Differential Viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301 (1949) and Rudin, A., Modern Methods of Polymer Characterization, John Wiley & Sons, New York (1991) pp. 103-112.

In contrast to "substantially linear ethylene polymer," "linear ethylene polymer" means that the polymer lacks measurable or demonstrable long chain branches, that is, the polymer is substituted with an average of less than 0.01 long chain branch per 1000 carbons.

Component A may also be or include one or more olefin block copolymers, such as those described in U.S. Pat. No. 7,355,089.

Suitable block ethylene polymers for Component A include the olefin block copolymers marketed by The Dow Chemical Company under the tradename "INFUSE."

Component B

Component B comprises one or more heterogeneous branched ethylene polymers having densities between 0.91 and 0.945 gm/cm$^3$, molecular weight distributions (Mw/Mn) greater than 3.5, and melt index (I$_2$) between 0.5 and 10 gm/10 minutes. The density of Component B is preferably between 0.91 and 0.96 gm/cm$^3$, more preferably between 0.91 and 0.95 gm/cm$^3$, and especially between 0.91 and 0.94 gm/cm$^3$. The melt index (I$_2$) of Component B is preferably between 0.5 and 8 gm/10 minutes, more preferably between 0.8 and 6 gm/10 minutes, and especially between 1 and 6 gm/10 minutes.

Suitable ethylene polymers for Component B include the LLDPE polymers marketed by The Dow Chemical Company under the tradename DOWLEX, the LDPE ethylene/α-olefin interpolymers disclosed in U.S. Pat. No. 4,076,698, and the LLDPE ethylene polymer marketed by Union Carbide Corporation under the tradename "FLEXOMER."

These interpolymers comprise ethylene with at least one C3-C20 α-olefin and/or C4-C18 diolefin. Preferred comonomers include propene, 1-butene, 1-pentene, 1-hexene, 4-methyl-1-pentene, 1-heptene, 1-octene, 1-nonene, and 1-decene, more preferably propene, 1-butene, 1-hexene, and 1-octene.

Heterogeneously branched ethylene interpolymers can be prepared using Ziegler-Natta catalyst systems. Both the molecular weight distribution, and the short chain branching distribution, each arising from α-olefin (or comonomer) copolymerization, are relatively broad compared to homogeneously branched linear and homogeneously branched linear substantially linear ethylene interpolymers. Heterogeneously branched linear ethylene interpolymers can be made in a solution, slurry, or gas phase process using a Ziegler-Natta catalyst. For example, see U.S. Pat. No. 4,339,507, which is fully incorporated herein by reference.

Heterogeneously branched linear ethylene-based interpolymers differ from the homogeneously branched ethylene-based interpolymers, primarily in their comonomer branching distribution. For example, heterogeneously branched interpolymers have a branching distribution, in which the polymer molecules do not have the same ethylene-to-comonomer ratio. For example, heterogeneously branched LLDPE polymers have a distribution of branching, including a highly branched portion (similar to a very low density polyethylene), a medium branched portion (similar to a medium branched polyethylene) and an essentially linear portion (similar to linear homopolymer polyethylene).

As discussed above, heterogeneously branched ethylene-based interpolymers are typically prepared with a Ziegler/Natta catalyst system. These linear interpolymers lack long chain branching, or measureable amounts of long chain branching, as discussed above.

Heterogeneously branched ethylene-based interpolymers include, but are not limited to, linear medium density polyethylene (LMDPE), linear low density polyethylene (LLDPE), very low density polyethylene (VLDPE), and ultra low density polyethylene (ULDPE). Commercial polymers include DOWLEX Polyethylene Resins, ATTANE Polyethylene Resins, TUFLIN Polyethylene Resins, and FLEXOMER Polyethylene Resins (all from The DOW Chemical Company), and ESCORENE LLDPE polymers (from Exxon Mobil).

Component C

Component C comprises one or more ethylene polymers having densities greater than 0.945 gm/cm$^3$, and melt index (I$_2$) between 0.01 and 10 gm/10 minutes. The density of Component C is preferably between 0.945 and 0.965 gm/cm$^3$, more preferably between 0.95 and 0.965 gm/cm$^3$, and especially between 0.952 and 0.96 gm/cm$^3$. The melt index (I$_2$) of Component C is preferably between 0.1 and 8 gm/10 minutes, more preferably between 0.5 and 5 gm/10 minutes, and especially between 0.8 and 4 gm/10 minutes.

Component C may be one or more high density homogeneous branched linear or substantially linear ethylene homopolymers or interpolymers (such as disclosed in U.S. Pat. Nos. 5,272,236 or 5,2787,272), which have a molecular weight distribution (Mw/Mn) less than 3, or one or more heterogeneous branched ethylene homopolymers or interpolymers (such as disclosed in U.S. Pat. No. 4,076,698, which have a Mw/Mn greater than 3.5, or some combination of those polymers.

Suitable ethylene polymers for Component C include the high density ethylene/α-olefin interpolymers disclosed in EP 898586 (Jacobson et al.), and the high density ethylene polymer marketed by Borealis under the designation "VL5580."

Manufacture of Components and Inventive Blends

The inventive blends may be prepared by mixing or kneading the respective components at a temperature around or above the melt point temperature of one or more of the components. For most components, this temperature may be above 150° C., most generally above 180° C., and most preferably above 200° C. Typical polymer mixing or kneading equipment that is capable of reaching the desired temperatures and melt plastifying the mixture may be employed. These include mills, kneaders, extruders (both single screw and twin-screw), Banbury mixers, calendars, and the like. The sequence of mixing and method may depend on the final composition. A combination of Banbury batch mixers and continuous mixers may also be employed, such as a Banbury mixer followed by a mill mixer followed by an extruder.

Additives and Other Optional Components

Additives and adjuvants may be included in the inventive compositions. Suitable additives include fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; and other natural and synthetic polymers, including other polymers according to embodiments of the invention, provided such additives and adjuvants do not interfere with the desired properties of the inventive blends.

The inventive compositions may also contain processing oils, plasticizers, and processing aids. Rubber processing oils having a certain ASTM designation and paraffinic, naphthenic or aromatic process oils are all suitable for use. Generally from 0 to 150 parts, more preferably 0 to 100 parts, and most preferably from 0 to 50 parts of oil per 100 parts of total polymer are employed. Higher amounts of oil may tend to improve the processing of the resulting product at the expense of some physical properties. Additional processing aids include conventional waxes, fatty acid salts, such as calcium stearate or zinc stearate, (poly)alcohols including glycols, (poly)alcohol ethers, including glycol ethers, (poly)esters, including (poly)glycol esters, and metal salt-, especially Group 1 or 2 metal or zinc-, salt derivatives thereof.

The inventive compositions may also contain anti-ozonants or anti-oxidants that are known to a polymer chemist of ordinary skill. The anti-ozonants may be physical protectants such as waxy materials that come to the surface and protect the part from oxygen or ozone or they may be chemical protectors that react with oxygen or ozone. Suitable chemical protectors include styrenated phenols, butylated octylated phenol, butylated di(dimethylbenzyl) phenol, p-phenylenediamines, butylated reaction products of p-cresol and dicyclopentadiene (DCPD), polyphenolic antioxidants, hydroquinone derivatives, quinoline, diphenylene antioxidants, thioester antioxidants, and blends thereof. In some applications, the anti-oxidants and anti-ozonants used will preferably be non-staining and non-migratory.

For providing additional stability against UV radiation, hindered amine light stabilizers (HALS) and UV absorbers may be also used. A Lewis acid may be additionally included with a HALS compound in order to achieve superior surface quality, as disclosed in U.S. Pat. No. 6,051,681.

In some embodiments, additional mixing process(es) may be employed to pre-disperse the anti-oxidants, anti-ozonants, carbon black, UV absorbers, light stabilizers and/or other additives or adjuvants to form a masterbatch, and subsequently to form the inventive compositions.

Where the inventive compositions will be used to produce artificial turf yarn, the additives may contain pigments (such as green, blue, white, and/or yellow pigments), a UV stabilizer (such as HALS), and processing aids (such as a fluoroelastomer). One or more of the desired additives may first be combined in a masterbatch, for example, a masterbatch which comprises 30 to 70 weight percent pigment, 10 to 60 weight percent of the UV stabilizer, and 10 to 50 weight percent of the processing aid. The masterbatch may then be blended with the other components of the inventive blends so as to result in the follow concentrations: pigment between 2 and 7 weight percent, UV stabilizer between 5000 and 15000 wppm, and processing aid between 0.1 to 1.0 weight percent. The additives may also be added separately.

The inventive compositions may also be crosslinked by any known means, such as the use of peroxide, electron beam, silane, azide, or other cross-linking technique. The polymers can also be chemically modified, such as by grafting (for example by use of maleic anhydride (MAH), silanes, or other grafting agent), halogenation, amination, sulfonation, or other chemical modification.

Fabricated Articles and End-Uses

Fibers: Fibers that may be prepared from the inventive blends include staple fibers, tow, multicomponent, sheath/core, twisted, and monofilament. Suitable fiber forming processes include spunbonded, and melt blown techniques, as disclosed in U.S. Pat. Nos. 4,430,563; 4,663,220; 4,668,566; and 4,322,027; gel spun fibers as disclosed in U.S. Pat. No. 4,413,110; woven and nonwoven fabrics, as disclosed in U.S. Pat. No. 3,485,706; or structures made from such fibers, including blends with other fibers, such as polyester, nylon or cotton.

The following oriented articles can also be made from the compositions taught herein: tapes, monofilaments, artificial turf, woven sheets, cross-laid composite sheets, and oriented films.

The inventive blends are also useful in sheet extrusion for vacuum forming operations, and forming molded articles, including the use of injection molding, blow molding process, or rotomolding processes. Compositions comprising the olefin polymers can also be formed into fabricated articles, such as those previously mentioned, using conventional polyolefin processing techniques, which are well known to those skilled in the art of polyolefin processing.

Test Methods

Linear Weight: The linear weight (in dtex) of a monofilament is equal to the weight of weighing 50 meters of the monofilament.

Shrinkage: The shrinkage of a monofilament (expressed as the percentage reduction in length of a 1 meter sample of the monofilament) is measured by immersing the monofilament for 20 seconds in a bath of silicon oil maintained at 90° C.

Tenacity and Residual Elongation: Tenacity and residual elongation of a monofilament are determined using a Zwick tensile tester, operating on a 260 mm length of the monofilament, and using an extension speed of 250 mm/minute until the filament breaks. The tenacity (in cN/dtex) is the "tensile stress (in cN) at break" divided by the "linear weight (in dtex)." Residual elongation (as a percentage of the original length) is percentage extension of the original length at break of the filament.

Density: Samples for density measurement are prepared according to ASTM D 1928. Measurements are made within one hour of sample pressing, using ASTM D792, Method B.

Melt Index: Melt index, or $I_2$, is measured in accordance with ASTM D 1238, Condition 190° C./2.16 kg. The $I_{10}$ is measured in accordance with ASTM D 1238, Condition 190° C./10 kg.

Differential Scanning Calorimetry

Differential Scanning Calorimetry (DSC) can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (~25° C.). A "3-10 mg," 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a "heat flow versus temperature" profile. First, the sample is rapidly heated to 180° C., and held isothermal for 3 minutes in order to remove its thermal history. Next, the sample is cooled to −40° C., at a 10° C./minute cooling rate, and held isothermal at −40° C. for 3 minutes. The sample is then heated to 150° C. (this is the "second heat" ramp) at a 10° C./minute heating rate. The cooling and second heating curves are recorded.

The cool curve is analyzed by setting baseline endpoints from the beginning of crystallization to −20° C. The heat curve is analyzed by setting baseline endpoints from −20° C. to the end of melt. The values determined are peak melting temperature ($T_m$), peak crystallization temperature ($T_c$), heat of fusion ($H_f$) (in Joules per gram), and the calculated % crystallinity for polyethylene samples using Equation (1):

% Crystallinity=$((H_f)/(292$ J/g$))\times100$ (Eq. 1)

The heat of fusion ($H_f$) and the peak melting temperature are reported from the second heat curve. Peak crystallization temperature is determined from the cooling curve.

Conventional GPC $M_{w\text{-}gpc}$ Determination

To obtain $M_{w\text{-}gpc}$ values, the chromatographic system consist of either a Polymer Laboratories Model PL-210 or a Polymer Laboratories Model PL-220. The column and carousel compartments are operated at 140° C. Three Polymer Laboratories 10 μm Mixed-B columns are used with a solvent of 1,2,4-trichlorobenzene. The samples are prepared at a concentration of 0.1 g of polymer in 50 mL of solvent. The solvent used to prepare the samples contain 200 ppm of the antioxidant butylated hydroxytoluene (BHT). Samples are prepared by agitating lightly for 4 hours at 160° C. The injection volume used is 100 microliters, and the flow rate is 1.0 mL/min Calibration of the GPC column set is performed with twenty one narrow molecular weight distribution polystyrene standards purchased from Polymer Laboratories. The polystyrene standard peak molecular weights are converted to polyethylene molecular weights using Equation 2:

$M_{polyethylene}=A(M_{polystyrene})^B$ (Eq. 2)

where M is the molecular weight, A has a value of 0.4316 and B is equal to 1.0. A third order polynomial is determined to build the logarithmic molecular weight calibration as a function of elution volume. Polyethylene equivalent molecular weight calculations are performed using Viscotek TriSEC software Version 3.0. The precision of the weight-average molecular weight $\Delta M_w$ is excellent at <2.6%.

EXAMPLES

The following examples are provided to illustrate the manufacture of the inventive blends and fabricated articles. Certain comparative examples are made with some existing polymers. The examples are presented to exemplify embodiments of the invention, but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

Examples 1-2 and Comparative Examples 1-3

Two inventive blends and three comparative ethylene polymers are prepared from one or more of the following components, and then are processed into monofilaments or yarns for evaluation in artificial turf applications. The components are listed in Table 1:

TABLE 1

Components for Examples 1-2, and Comparative Examples 1-3

| Polymer Code | Ethylene polymer component | Polymer Type | Density (gm/cm³) | $I_2$ (gm/10 min.) |
|---|---|---|---|---|
| X | DOWLEX ™ SC2107G | LLDPE | 0.917 | 2.3 |
| Y | SABIC 318B | LLDPE | 0.918 | 2.8 |
| AB | ELITE ™ 5230G | SLEP-LLDPE | 0.916 | 4 |
| C | Borealis VL5580 | HDPE | 0.958 | 0.95 |

"DOWLEX" and "ELITE" are trademarks of The Dow Chemical Company.

The DOWLEX and SABIC polymers are conventional Ziegler-Natta catalyzed copolymers of ethylene-octene and ethylene-butene, respectively, which are commercially available from The Dow Chemical Company and SABIC (Saudi Basic Industries Corporation), respectively. The ELITE polymer is an in situ composition of a single-site-catalyzed, homogeneous, long chain branched, substantially linear ethylene-octene copolymer (which is suitable as Component A of the inventive blends), and of a Ziegler-Natta-catalyzed, heterogeneous branched linear low density ethylene-octene copolymer (which is suitable as Component B of the inventive blends), and the split is about "50 wt % homogeneous/50 wt % heterogeneous, based on the amount of this polymer" and which is commercially available from The Dow Chemical Company. The Borealis polymer (which is suitable as Component C of the inventive blends) is a Ziegler-Natta-catalyzed, heterogeneous branched, high density ethylene polymer which is commercially available from BOREALIS.

Various components or combinations are blended with a green-pigmented masterbatch and a processing aid, such as fluoroelastomer, such that the oriented articles contain about "4 weight percent" of the pigment and about "0.5 weight percent" of the processing aid, and then are extruded on a single-screw monofilament extruder, equipped with a melt pump, a circular die with 160 rectangular spinnerets of 4 mm length and 0.5 mm width. The temperature settings of the extruder zones are set forth in Table 2.

TABLE 2

Temperature Settings in Extruder Zones

| | Zone | | | | | | | |
|---|---|---|---|---|---|---|---|---|
| Z1 | Z2 | Z3-Z5 | flange | filters | Adapter | Melt pump | Defl | dies |
| °C. 180 | 220 | 230 | 230 | 230 | 230 | 230 | 230 | 230 |

The extrudates from the extruder are immersed in a waterbath, located 30 mm from the extruder dies, then are dried, and preheated on hot rolls (rollers), each at a velocity v0=30 meters/minute. Then, the extrudates are passed through a first hot air oven maintained at 96° C., and are stretched at ratios from 4 to 6, and passed to rollers at velocities from 120 meters/minute to 180 meters/minute, corresponding to the stretch ratios from 4 to 6, respectively (as shown in Table 3, a stretching ratio of 5.36 results in a velocity of 160.8 meters/minute). In a second hot air oven maintained at 97° C., the stretched extrudates are annealed (i.e., relaxed) at ratios from 0.7 to 0.9, and passed to rollers at velocities (v1) from 84 meters/minute to 162 meters/minute, corresponding to the annealed ratios from 0.7 to 0.9, respectively. This results in velocity ratios for v1/v0 from 2.8 to 5.4, depending on the stretching and relaxation ratios used. Velocity v1 will at least be "2 times v0" for the inventive purpose. The linear weight of the extrudates or monofilaments is about 1300 dtex.

Table 3 identifies the polymer compositions, the stretch ratios, the tenacity, the residual elongation, and the shrinkage for the monofilaments made from the inventive blends of Examples 1 and 2, and also of the polymer compositions in Comparative Examples 1, 2 and 3.

TABLE 3

Blend Compositions and Performance of Monofilaments

| Example or Comparative | Components | Stretch ratio | Tenacity (cN/dtex) | Residual Elongation (%) | Shrinkage (%) |
|---|---|---|---|---|---|
| Ex. 1 | 90 parts AB + 10 parts C | 5.36 | 11.80 | 89.80 | 7.5 |
| Ex. 2 | 80 parts AB + 20 parts C | 5.36 | 11.80 | 89.50 | 4.5 |
| Comp Ex 1 | 100 parts Y | 5.20 | 9.15 | 87.18 | 10.0 |
| Comp Ex 2 | 100 parts X | 5.36 | 10.46 | 53.40 | 10.2 |
| Comp Ex 3 | 100 parts AB | 5.36 | 10.50 | 74.60 | 9.6 |

The data in Table 3 demonstrate that the monofilaments made from the inventive blends of Examples 1 and 2 have significantly lower shrinkage than those monofilaments made from either the conventional Ziegler-Natta-catalyzes heterogeneous branched linear low density ethylene polymers of Comparative Examples 1 and 2, or the in situ blend of components A and B (but not component C) in Comparative Example 3. Surprisingly, this improvement in shrinkage is not achieved at the expense of the important properties of tenacity or residual elongation. Rather, both the tenacity and the residual elongation performance of the monofilaments made from the inventive blends are surprisingly superior to that of the Comparative Examples 1-3.

While the invention has been described with respect to a limited number of embodiments, the specific features of one embodiment should not be attributed to other embodiments of the invention. No single embodiment is representative of all aspects of the invention. In some embodiments, the compositions or articles may include numerous additional components not mentioned herein. In other embodiments, the compositions or articles do not include, or are substantially free of, any components not enumerated herein. Variations and modifications from the described embodiments exist. Finally, any number disclosed herein should be construed to mean approximate, regardless of whether the word "about" or "approximately" is used in describing the number. The appended claims intend to cover all those modifications and variations as falling within the scope of the invention.

We claim:

1. An oriented monofilament that is fabricated from a polymeric blend comprising, based on 100 parts of total polymer:
   (a) 20 to 50 parts of a first component (A) comprising a homogeneous ethylene polymer having a density between 0.85 and 0.90 gm/cm$^3$, and a Mw/Mn less than 3, and a melt index ($I_2$) between 0.5 and 5 gm/10 minutes; and
   (b) 30 to 80 parts of a second component (B) comprising a heterogeneous branched ethylene polymer having a density between 0.91 and 0.945 gm/cm$^3$, and a Mw/Mn greater than 3.5, and a melt index ($I_2$) between 0.5 and 10 gm/10 minutes; and
   (c) 2 to 25 parts of a third component (C) comprising an ethylene polymer having a density greater than 0.945 gm/cm$^3$, and a melt index ($I_2$) between 0.01 and 10 gm/10 minutes.

2. The article of claim 1 wherein the polymeric blend has a relationship between stiffness, in cN/tex/mm, and density, in g/cm$^3$, such that stiffness ≤4.8364(density)−4.3324.

3. The article of claim 1, wherein the monofilament is used in artificial turf.

4. The article of claim 1 in which the homogeneous ethylene polymer of the first component is a substantially linear ethylene copolymer.

5. The article of claim 1 in which the homogeneous ethylene polymer of the first component is a linear ethylene copolymer.

6. A process for forming the oriented article of claim 1 in which:
   (a) the first and second components are blended in situ during the formation of such components in one or more polymerization reactors, to thereby form a blend component (AB), and
   (b) the third component (C) is formed in separate polymerization reactor(s), and
   (c) the third component is blended ex situ with the partial blend (AB) to form the polymeric blend of claim 1, and
   (d) the polymeric blend is then processed to form the oriented article.

7. A process for forming the oriented article of claim 1 in which:

(a) the first and third components are blended in situ during the formation of such components in one or more polymerization reactors, to thereby form a blend component (AC), and (b) the second component (B) is formed in separate polymerization reactor(s), and (c) the second component (B) is blended ex situ with the partial blend (AC) to form the polymeric blend of claim 1, and (d) the polymeric blend is then processed to form the oriented article.

8. A process for forming the oriented article of claim 1 in which:

(a) the second and third components are blended in situ during the formation of such components in one or more polymerization reactors, to thereby form a blend component (BC), and (b) the first component (A) is formed in separate polymerization reactor(s), and (c) the first component (A) is blended ex situ with the partial blend (BC) to form the polymeric blend of claim 1, and (d) the polymeric blend is then processed to form the oriented article.

9. The article of claim 1 in which the ethylene polymer of the third component is a homogeneous linear or substantially linear ethylene polymer having an Mw/Mn less than 3.

10. The article of claim 1 in which the ethylene polymer of the third component is a heterogeneous polymer having an Mw/Mn greater than 3.5.

* * * * *